June 21, 1966   D. I. SAPPER   3,257,266
WEATHERABLE FIBER-REINFORCED POLYESTER STRUCTURES AND PROCESS
Filed June 24, 1960
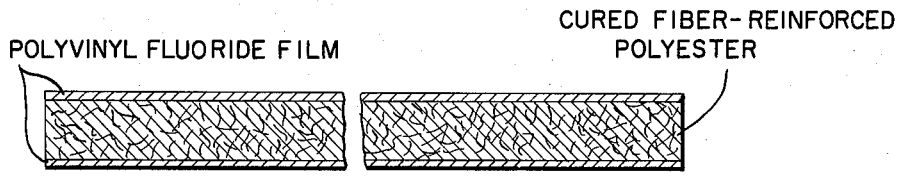
INVENTOR
DAVID IVAN SAPPER
BY
ATTORNEY

United States Patent Office 3,257,266
Patented June 21, 1966

3,257,266
WEATHERABLE FIBER-REINFORCED POLYESTER STRUCTURES AND PROCESS
David Ivan Sapper, Buffalo, N.Y., assignor to E. I. du Pont de Nemours and Company, Wilmington, Del., a corporation of Delaware
Filed June 24, 1960, Ser. No. 38,523
14 Claims. (Cl. 161—188)

This invention relates to reinforced plastic structures, and more particularly to weatherable structures of glass fiber-reinforced polyester plastics.

Because of their comparatively low cost and high strength-to-weight ratio, reinforced plastics, particularly those based on glass fiber-reinforced polyester systems are rapidly replacing other materials of construction in the manufacture of many shaped structures which are currently articles of commerce.

Important among these structures are many which are exposed outdoors to the ravages of weathering either continually or at least intermittently during their use life. Among such structures may be included boat hulls and superstructure, lift rafts and their containers, automobile bodies and detachable hard-tops, radar canopies and other antennae housings, rain shelters, aircraft radomes, harbor and channel buoys, outdoor walk-in telephone booths, horse trailers, aircraft wing and empennage tips, luggage trailers, some contour furniture, swimming pools, forms for reinforced concrete, geodesic domed structures such as barns, auditoriums, etc., storage tanks for water and chemicals, house trailers, baby carriages, skis, sleds, toboggans, safety helmets, luggage, helicopter rotor blades, surfboards, highway and building signs, tanks for truck transport of liquids, cargo van bodies, agricultural animal trailers and in the construction of housing and other buildings in the form of roofings and sidings, skylights, awnings, flashing, rain gutters, downspouts and overhead garage doors.

A serious deficiency of glass fiber-reinforced polyester structures, however, is their poor resistance to the ravages of weathering. This deficiency manifests itself in the form of surface erosion of the structure causing a loosening and raising of the reinforcing fibers near the surface. Not only is the resulting fuzzy appearance unsightly from an aesthetic point of view but the raised fibers provide multiple paths for the ingress of water into the body of the structure, thus accelerating hydrolytic degradation. Attempts to correct this deficiency have included the use during the curing operation of pure resin or resin-rich outer layers of polyester called gel coats and/or veils or overlays of fabrics which simultaneously produce a reinforced resin-rich surface and serve as retainers for the non-woven reinforcing fibers in the structure. Such veils or overlays are generally made of tiny filaments or fibers of synthetic or natural textile materials and may be in the form of woven or non-woven fabrics. Many different materials have been and are being used as veils including glass, polyester fibers, acrylic fibers, e.g., those of a copolymer of vinyl chloride and acrylonitrile, cotton, paper, viscose and acetate rayon, and nylon. While these methods have been somewhat effective in lessening the problem, they are costly and again merely postpone rather than eliminate the trouble inasmuch as the inherently unweatherable and hydrolytically unstable polyester is still exposed outermost in the structure. Still another method employed in an attempt to correct the above-described deficiency entails the application of weather-resistant coatings such as acrylic polymer-based lacquers, after the curing operation, to the surfaces of the structures. However, this procedure is also costly and while it improves somewhat the weatherability of the structure, it too merely serves to postpone the trouble.

An additional problem exists in the manufacture of glass fiber-reinforced polyester structures. Most of these structures are made by low pressure molding techniques wherein the use of a mold release agent is virtually mandatory if the desired surface appearance of the finished article is to be achieved and if the molds are to be readied for reuse without undue processing delay. Among mold release agents commonly employed may be included films (as parting sheets) such as cellophane, polyvinyl alcohol, vinyl acetate/vinyl chloride copolymers, polyethylene, glassine paper, cellulose acetate and polyvinyl chloride; film-formers such as water solutions of sodium alginate, casein, methyl cellulose and polyvinyl alcohol, and solvent solutions of cellulose acetate; waxes such as carnauba and candelilla; and lubricants such as graphite, lecithin, sulfate esters, alkyl phosphates, petroleum jelly and silicone greases. Many of the films employed as parting sheets have little if any reuse valve, and many of the film-formers, waxes and lubricants are costly and require frequent reapplication to be effective.

An object of the present invention, therefore, is to provide fiber-reinforced polyester structures having good weathering characteristics. Another object is to provide a process for producing weather-resistant molded structures of fiber-reinforced polyester. Still another object is to provide an improved process for the molding of fiber-reinforced polyester structures. A further object is to provide a molded structure having a base of fiber-reinforced polyester and an adherent, continuous (unbroken) surface of weatherable polyvinyl fluoride. The foregoing and additional objects will more clearly appear from the description which follows.

These objects are realized by the present invention which, briefly stated, comprises, in the process of producing fiber-reinforced polyester structures wherein a mixture consisting essentially of (1) at least one organic linear polymeric ester containing recurring ethylenic unsaturation; (2) at least one addition-polymerizable, ethylenically unsaturated organic monomer; and (3) reinforcing fibers, is subjected, in a mold surfaced with a mold release agent, to addition-polymerization conditions effective to produce a cured, fiber-reinforced polyester structure, the improvement which comprises using as the mold release agent a surface-receptive, preformed, solid film of polyvinyl fluoride whereby to produce a unitary shaped structure consisting essentially of a fiber-reinforced polyester substrate and a surface of polyvinyl fluoride film directly (i.e., without an intermediate adhesive layer) bonded to said substrate.

Unsaturated polymeric esters suitable for use in the preparation of the fiber-reinforced polymeric structures in accordance with this invention are, as indicated above, those now being employed commercially, and are commonly prepared by condensing under polymerizing conditions, either (1) an ethylenically unsaturated dicarboxylic acid with a diol containing no ethylenic unsaturation, (2) a dicarboxylic acid containing no ethylenic unsaturation with an ethylenically unsaturated diol or, and most commonly, (3) a mixture of ethylenically unsaturated dicarboxylic acids, and dicarboxylic acids containing no ethylenic unsaturation, with a diol containing no ethylenic unsaturation. Where stable dichlorides, diesters or anhydrides of the dicarboxylic acids are available, they may be substituted therefor. Among the ethylenically unsaturated dicarboxylic acids or derivatives thereof which are commonly employed may be mentioned fumaric acid, maleic acid and its anhydride, citraconic acid, mesaconic acid, itaconic acid and endomethylene tetrahydrophthalic acid. Among the dicarboxylic acids or derivatives thereof containing no ethylenic unsaturation which are commonly employed may be mentioned phthalic acid and its anhydride, adipic acid, sebacic acid, isophthalic acid, terephthalic acid, malonic acid, succinic acid and glutaric acid. A frequently employed ethylenically unsaturated diol is 2-butene-1,4-diol, while among the commonly employed diols containing no ethylenic unsaturation may be mentioned ethylene glycol, propylene glycol, diethylene glycol and dipropylene glycol. As will be obvious to those skilled in the art, varying the proportions and nature of the ethylenically saturated and unsaturated reactants in these condensations affects the number of carbon-to-carbon double bonds in a given polymer chain length available for cross-linking by addition-polymerization means.

Among the addition-polymerization compounds most commonly employed as cross-linking agents in combination with the above-described polyesters in the manufacture of fiber-reinforced polymeric structures may be mentioned styrene, diallyl phthalate, methyl methacrylate and triallyl cyanurate. Other ethylenically unsaturated cross-linking agents more or less frequently employed in these operations include alpha-methylstyrene, divinyl benzene, vinyl toluene allyl diglycolate, methyl acrylate ethyl acrylate, ethyl methacrylate, vinyl acetate, acrylonitrile, diallyl maleate, vinyl phenol and allyl carbamate. Frequently more than one of the above cross-linking agents is employed in the same mixture, depending on the properties desired in the final structure and the use to which it will be put.

While asbestos, nylon, cellulosic, and like mineral and organic fibers may be incorporated in the mixtures employed in making the structures of the present invention, glass reinforcing fibers are preferred, particularly from the strength-versus-cost standpoint. Fibrous glass is available for reinforcing such structures in the form of cloth, yarns, mats, rovings, milled fibers, parallel strands, surfacing mats and loose fibers. The selection of the particular form in which the glass fibers are to be used and the quantity thereof in proportion to the other ingredients in the mixture permits of wide latitude and is a further means of varying the properties of the final structure, in addition to varying the proportions and specific nature of the polyester and cross-linking agent respectively.

Fillers such as pigments, clays, mica, silica, talc, etc., may be incorporated into the mixtures prior to curing. While some of the addition-polymerization cross-linking reactions proceed spontaneously at normal temperatures, heat is frequently used to accelerate the reaction, as are accelerators or promoters such as cobalt naphthenate, phenyl phosphinic acid, p-toluene sulfonic acid and some tertiary amines, e.g., dimethylaniline. Catalytic initiators such as benzoyl peroxide, t-butyl peroxide, di-t-butyl peroxide, methyl ethyl ketone peroxide, cyclohexanone peroxide, organic azo compounds, and lauryl peroxide, are also frequently employed to insure reactivity within a reasonable time.

Ultraviolet light absorbting compounds and antioxidants may be also frequently incorporated in these mixtures, particularly where the resulting structure is destined for continual use outdoors.

The novel structures of this invention may be made by any of the commonly employed low pressure molding techniques including vacuum-bag, pressure-bag and matched metal dies. The addition-polymerization cross-linking reactions are generally quite exothermic and some care is usually taken to prevent the temperature of the reacting mass from rising so high as to boil off the cross-linking monomer before it has had an opportunity to react completely. The specific duration and temperature history of the cure will depend on many variables including the proportions and specific natures of the reacting ingredients and catalysts as well as, in some cases, the physical bulk of the reacting mass.

Polyvinyl fluoride films useful for purposes of this invention may be made by a variety of means. A particularly useful method for making polyvinyl fluoride films consists of the steps of feeding a latent solvent/particulate polyvinyl fluoride mixture to a heated extruder which is connected to a slotted casting hopper, from whence a tough coalesced gel polyvinyl fluoride film containing latent solvent is continuously extruded. This latent solvent-containing film is then stretched first longitudinally over heated rolls and then transversely in a tenter frame, in which it is held in restraint while the remaining latent solvent is volatilized. These extrusion and stretching procedures are described in detail in copending United States Patent Application Serial No. 715,394, now U.S. Patent 2,953,818 filed February 14, 1958, in the name of Lester Ray Bartron and Serial No. 801,441, filed March 24, 1958, in the names of Robert Smith Prengle and Robert Laurence Richards, Jr. If desired, various color and/or opacity effects may be achieved in the manufacture of these fiber-reinforced polymeric structures by incorporating suitable pigments into the polyvinyl fluoride/latent solvent mixtures being fed to the extruder.

Polyvinyl fluoride films found to be particularly useful in the process of this invention are those biaxially oriented films which exhibit some finite shrinkage when exposed for 30 minutes in a circulating air oven maintained at 60° C., preferably from about 0.2% to about 5.0% in each direction of stretch.

When it is desirable to protect the fiber-reinforced polymeric resin structure from the deteriorating influence of ultraviolet light, this may be accomplished by (1) incorporating a suitable ultraviolet light absorbing compound directly into the polyvinyl fluoride films themselves by blending the absorber into the polymer-solvent (and/or pigment) mixtures from which the films are prepared, or by (2) chemically bonding the absorbers into a surface of the polyvinyl fluoride film (particularly the surface which is to be united with the fiber-reinforced polymeric resin structure) by, for example the use of polyisocyanates according to procedures described in copending United States Patent Application Serial No. 836,933, now U.S. patent 2,970,066, filed August 31, 1959, in the name of Donald Eugene Brasure. As examples of representative ultraviolet light absorbent compounds there may be mentioned 2-2'-dihydroxy-4,4'-dimethoxybenzophenone, 2,2' - 4,4' - tetrahydroxydroxybenzophenone, 2-hydroxy-4,4' - dimethoxybenzophenone, 2,4 - dihydroxybenzophenone, etc.

A critical feature of the present invention is that the preformed solid polyvinyl fluoride film, substituted for the conventional mold release agent (an agent effective to prevent the molded structure from sticking to the walls of the mold) in the molding operation, must be surface-receptive, i.e., at least one of its surfaces should contain functional groups selected from the group consisting of ethylenic unsaturation and hydroxyl, carboxyl, carbonyl, amino and amido groups.

Polyvinyl fluoride films may be rendered surface-receptive and thereby suitable for use in the process of this invention by any of a number of surface treatments. For example (1) they may be passed through a stainless steel lined treating chamber containing a gaseous mixture consisting of from about 35% to 90% boron trifluoride maintained at a temperature in the range of from about 20° C. to 75° C. for a period of from about 3 to 30 seconds followed by either (a) washing in an ammonium hydroxide solution followed by a water-wash and drying in air whereby to create surface ethylenic unsaturation and amino and amido surface groups; or (b) a water-wash followed by drying in air whereby to create surface ethylenic unsaturation and hydroxyl surface groups; or (c) heating for a brief period at temperature ranging between about 100° C. and 150° C. whereby to create surface ethylenic unsaturation and carboxyl and carbonyl surface groups; or (2) they may be immersed in or contacted with concentrated sulfuric acid, fuming sulfuric acid or sulfur trioxide, for brief periods of time ranging from about two seconds to about one minute, followed by a water-wash and then air drying whereby to create hydroxyl and carbonyl surface groups. This may be done at temperatures ranging from about 25° C. to as high as 95° C. It will be understood, of course, that the exposure time necessary to render the film surface-receptive will decrease as either the concentration of the acid or the temperature of the solution is increased; or (3) they may be immersed briefly in boron trifluoride-etherate complexes followed by either a water-wash or an ether wash followed by heating in air to dry whereby to create surface ethylenic unsaturation and hydroxyl surface groups. Such immersions may vary widely in time and will depend somewhat upon the temperature at which the complex is maintained; or (4) they may be flame treated by passing at rates of from 100 to 250 feet per minute over and in contact with a chilled metal drum while the surface away from the drum passes through the flame of a gas burner fueled with a 1:20 propane:air mixture whereby to create surface ethylenic unsaturation and hydroxyl, carboxyl and carbonyl surface groups; or (5) they may be subjected to a high frequency spark discharge in an atmosphere comprising chiefly nitrogen by passing at rates of from 10 to 300 feet per minute over and in contact with a grounded metal drum while the surface away from the drum passes under and in close proximity to (1/32 inch to 1/2 inch) a rod or bar serving as the electrode, said electrode being connected to a source of high frequency alternating voltage whereby to create surface ethylenic unsaturation and hydroxyl, carboxyl, and carbonyl surface groups.

The surfaces of polyvinyl fluoride films treated by any one of the above-described techniques are known to contain one or more of the above-mentioned functional groups.

The following specific examples, presented in tabular form, will serve to further illustrate the principles and practice of this invention. In the interest of brevity the following codes are used in the tables to identify polyvinyl fluoride film species, coatings, polyester resin formulations, and curing cycles.

POLYVINYL FLUORIDE FILM TYPES

*Types A, B, C, D and E*

Types A through E were manufactured by extruding from a heated casting hopper a coalesced film of polyvinyl fluoride containing a latent solvent therefor, stretching said solvent-containing polyvinyl fluoride film in two mutually perpendicular directions, followed by heating to remove said latent solvent. Type A is a highly oriented polyvinyl fluoride film. Type B is somewhat less oriented than Type A and exhibits better dimensional stability on exposure at elevated temperatures, i.e., above about 100° C. Types C, D and E are highly oriented types like Type A except that, unlike Types A and B, they exhibit some finite dimensional shrinkage at 60° C.

*Types A/TB, B/TB, C/TB, D/TB and E/TB*

Film Types A, B, C, D and E which have been rendered surface-receptive by passing through a stainless steel lined treating chamber containing a gaseous mixture consisting of about 50% boron trifluoride and about 50% air, maintained at 22° C. for a period of approximately 24 seconds, followed by a water-wash and air drying.

*Type A–1/TB*

Same as Type A/TB except that the film contained 1.5% by weight of 2-hydroxy-4-decyloxybenzophenone, based on the weight of the polymer.

*Type B–1/TB*

Same as Type B/TB except that the film contained 0.7% by weight of 2-hydroxy-4-decyloxybenzophenone, based on the weight of the polymer.

*Type A/TF*

Film Type A which has been rendered surface-receptive by flame treatment according to the method above-described.

*Type B/TS*

Film Type B which has been rendered surface-receptive by subjecting to the electrical spark discharge treatment described above.

COATING TYPES

*Type 1*

Three parts by weight of a 60% solution in methyl isobutyl ketone of a polyisocyanate are dissolved in 97 parts of methyl ethyl ketone and a 5 mil thick layer of this solution doctored onto the film surface to be coated. After drying in air for from 5 to 15 minutes at room temperature, the remaining solvent is volatilized by heating for about 5 minutes in a circulating air oven maintained at about 105° C. The polyisocyanate referred to above is the product of the reaction of 2 mols of trimethylolpropane with 5 mols of an isomeric mixture containing approximately 80 mol percent of 2,4-toluene diisocyanate and about 20 mol percent of 2,6-toluene diisocyanate.

*Type 2*

Three parts of dicyclopentadiene diepoxide was dissolved in 97 parts of methyl ethyl ketone and a coating applied and dried as indicated above in Coating Type 1.

*Type 3*

Three parts of the polyisocyanate solution described under Coating Type 1 and three parts of 2-(2'-hydroxy-5'-methylphenyl)-1,3-benzotriazole were dissolved in 97 parts of methyl ethyl ketone and a coating applied to the film and dried as indicated above.

*Type 4*

Same as Coating Type 3 except that three parts of 2,2',4,4'-tetrahydroxybenzophenone was substituted for the three parts of the benzotriazole.

*Type 5*

A 3 mil coating of a 25% solution of an aminated methyl methacrylate/glycidyl methacrylate copolymer dissolved in a mixed solvent consisting of about 4 parts of toluene, 5 parts of isopropanol and 3 parts of xylene was doctored onto the film and dried following the procedure indicated above.

*Type 6*

0.4 part of the benzotriazole employed in Coating Type 3 was dissolved in 25 parts of the acrylic copolymer solution used in Coating Type 5. After doctoring onto the film a 3 mil thick coating of this solution, solvent was volatilized by the procedure described above.

*Type 7*

Same as Coating Type 6 except that 0.2 part of 2,2',4,4'-tetrahydroxybenzophenone was substituted for the 0.4 part of the benzotriazole.

*Type 8*

Five parts of the polyisocyanate solution employed in Coating Type 1 and 0.9 part of the benzotriazole employed in Coating Type 3 were dissolved in 100 parts of a 30% solution in methyl isobutyl ketone of a copolyester obtained by reacting a slight stoichiometric excess of ethylene glycol with a mixture of the dimethyl esters of terephthalic, isophthalic and sebacic acids. A three mil thick coating was doctored onto the film and the solvent volatilized by the procedure described above.

Type 9

1.2 parts of the benzotriazole employed in Coating Type 3 was dissolved in a 40% solution of equal parts of a melamine resin and a copolyester obtained by reacting a slight stoichiometric excess of ethylene glycol with a mixture of the dimethyl esters of terephthalic, isophthalic, sebacic and adipic acids in a mixed solvent consisting of approximately 8 parts dioxane, 8 parts toluene, one part cyclohexanone and 3 parts of a butanol/methanol mixture. A 3 mil coating was doctored onto the film and the solvent volatilized by the procedure described above.

Type 10

The same as Coating Type 3 except that 4 parts of the benzotriazole was employed.

Type 11

Four parts of the benzotriazole employed in Coating Type 3 was dissolved in 97 parts of methyl ethyl ketone. A 5 mil thick coating was doctored onto the film and the solvent volatilized as before.

POLYESTER RESIN FORMULATIONS

Formula R-1

75 parts of a mixture consisting of about 20% by weight of methyl methacrylate and about 80% by weight of an unsaturated polyester formed by reacting a slight stoichiometric excess of propylene glycol with a mixture consisting of about 60 mol percent of phthalic anhydride and about 40 mol percent of maleic anhydride
20 parts of styrene
0.5 part of benzoyl peroxide
0.5 part of a 60% solution of methyl ether ketone hydroperoxide in dimethyl phthalate
0.05 part of a solution consisting of about 6 parts by weight of cobalt naphthenates and about 51 parts by weight of naphthenic acids dissolved in about 43 parts by weight of mineral spirits.

Formula R-2

160 parts of a mixture consisting of about 25% by weight of styrene and about 75% by weight of an unsaturated polyester formed by reacting a slight stoichiometric excess of propylene glycol with a mixture consisting of about 60 mol percent of phthalic anhydride and about 40 mol percent of maleic anhydride
35 parts of styrene
2 parts of benzoyl peroxide.

Formula R-3

160 parts of the mixture employed in Formula R-2
40 parts of styrene
1 part of benzoyl peroxide
1 part of the methyl ether ketone hydroperoxide solution of Formula R-1
0.1 part of the cobalt naphthenate solution of Formula R-1.

Formula R-4

160 parts of the mixture employed in Formula R-2
35 parts of styrene
3.3 parts of the methyl ethyl ketone hydroperoxide solution of Formula R-1
0.1 part of the cobalt naphthenate solution of Formula R-1.

Formula R-5

150 parts of the mixture employed in Formula R-1
40 parts of styrene
3.3 parts of the methyl ethyl ketone hydroperoxide solution of Formula R-1
0.1 part of the cobalt naphthenate solution of Formula R-1.

Formula R-6

160 parts of the mixture employed in Formula R-2
40 parts of styrene
2 parts of the methyl ethyl ketone hydroperoxide solution of Formula R-1
0.1 part of the cobalt naphthenate solution of Formula R-1.

Formula R-7

170 parts of a mixture consisting of about 30% by weight of styrene and about 70% by weight of an unsaturated polyester formed by reacting a slight stoichiometric excess of propylene glycol with a mixture consisting of about 60 mol percent of phthalic anhydride and about 40 mol percent of maleic anhydride.
30 parts of methyl methacrylate
1 part of benzoyl peroxide
1.2 parts of the methyl ethyl ketone hydroperoxide solution of Formula R-1
0.2 part of the cobalt naphthenate solution of Formula R-1.

Formula R-8

150 parts of the mixture employed in Formula R-2
35 parts of styrene
2 parts of benzoyl peroxide

Formula R-9

170 parts of the mixture employed in Formula R-7
30 parts of styrene
1 part of benzoyl peroxide
1 part of the methyl ethyl ketone hydroperoxide solution of Formula R-1
0.1 part of the cobalt naphthenate solution of Formula R-1.

Formula R-10

170 parts of the mixture employed in Formula R-7
30 parts of methyl methacrylate
1.5 parts of benzoyl peroxide
0.5 part of the methyl ethyl ketone hydroperoxide solution of Formula R-1
0.1 part of the cobalt naphthenate solution of Formula R-1.

CURING CYCLES

I. Fifteen minutes at 85° C., followed by 15 minutes during which the temperature is raised steadily from 85° C. to 115° C., followed by 7 minutes at 115° C. During this entire cycle, the fiber-reinforced resin mixture being cured is under the pressure specified in each example.

II. Curing Cycle I followed by 2 to 10 minutes at 150° C. with no pressure on the substantially cured structure.

III. The time specified in each example at room temperature (i.e., 20/25° C.) followed by 20 minutes at 115° C., followed by from 1 to 5 minutes at 150° C. During the room temperature and 115° C. exposures, the fiber-reinforced resin mixture being cured is under the pressure specified in each example. During the 150° C. exposure there is no pressure on the substantially cured structure.

The structures of the examples were prepared as follows: A 4 inch by 6 inch piece of the indicated type of polyvinyl fluoride film was placed on a flat glass plate and a dam formed around its four edges with a length of $\frac{1}{16}$ inch diameter twine. A degassed blend of the indicated polyester formulation was then poured onto the polyvinyl fluoride film and allowed to flow and spread evenly over the area bounded by the twine. Next a 4 inch by 6 inch piece of chopped strand fiber glass mat (2 ounces/ft.²) weighing approximately 9 grams was placed in the polyester polymerizable monomer layer. When the resin mixture had welled up through the interstices of the mat, a second 4 inch by 6 inch by 0.002 inch piece of the polyvinyl fluoride film was placed on top, followed by another glass plate and sufficient extra weight to establish a pressure of the indicated value over the 4 inch by 6 inch area. The entire sandwich was then placed in an oven and subjected to the curing cycle. The resulting panel in each case exhibited unbroken surfaces of polyvinyl fluoride film over a substrate of cured polyester. A typical panel is illustrated in the cross-sectional view of the accompanying drawing. The details of the further evaluation of each panel appears in the following tables.

strate that polyfunctional adhesion promoters such as polyepoxides and polyisocyanates (the latter both with and without ultraviolet light absorbers), when used in conjunction with surface-receptive polyvinyl fluoride film, produce very strong, moisture-resistant bonds. These examples also show that there is no particular advantage in or need for using adhesive layers such as in Examples 5, 6 and 7. Example 12 demonstrates the use of the invention whereby the realization of strong and highly water-resistant bonds between surface-receptive polyvinyl fluoride film and fiber-reinforced polyester structures

TABLE I

| Ex. No. | Film Type | Film Thickness, mils | Coating Type | Polyester Resin Formulation | Curing Cycle | Pressure During Cure, oz./in.² | Surface Appearance of Panel | Peeling Bond Strength, g./in. | | | |
|---|---|---|---|---|---|---|---|---|---|---|---|
| | | | | | | | | Initial | After 1.5 hours in boiling tap water [1] | After 4 wks. in 40° C. tap water [1] | After 3 mos. Outdoor Exposure [2] |
| 1 | B | 2 | None | R-1 | I | 4 | Smooth | 75-100 | | | |
| 2 | A | 2 | 1 | R-1 | I | 4 | ----do---- | 150-200 | | | |
| 3 | A/TB | 2 | 9 | R-1 | I | 4 | ----do---- | CNS | | 60 | |
| 4 | A/TB | 2 | 8 | R-1 | I | 4 | ----do---- | 480 | | 240 | |
| 5 | A/TB | 2 | 5 | R-1 | II | 4 | ----do---- | TOB | | TOB | CNS. |
| 6 | A/TB | 2 | 6 | R-1 | II | 4 | ----do---- | TOB | | TOB | CNS. |
| 7 | A/TB | 2 | 7 | R-1 | II | 4 | ----do---- | TOB | | TOB | CNS. |
| 8 | A/TB | 2 | 1 | R-1 | II | 4 | ----do---- | TOB | | CNS | CNS. |
| 9 | A/TB | 2 | 2 | R-1 | II | 1 | ----do---- | TOB | | TOB | |
| 10 | A/TB | 2 | 3 | R-1 | II | 4 | ----do---- | TOB | CNS | 1,800 | CNS. |
| 11 | A/TB | 2 | 4 | R-1 | II | 4 | ----do---- | TOB | | TOB | CNS. |
| 12 | A/TB | 2 | None | R-1 | II | 4 | ----do---- | CNS | | TOB | CNS. |

CNS—Could Not Start; film so firmly bonded to reinforced polyester structure that it was not possible to lift up enough film to start a peel test.
TOB—Tore Or Broke; film very difficult to lift from reinforced polyester structure and tore or broke off in little pieces, indicating a strong peeling bond.
[1] Bond strength tested while panels were still wet.
[2] Buffalo, N.Y., mounted on racks facing due south and slanted at 45 degrees to the horizontal.

In Table I, Examples 1 and 2, respectively, demonstrate that polyvinyl fluoride film that has not been treated to render its surface receptive will not bond satisfactorily to the fiber-reinforced polyester structures during the curing stage, even when known adhesion promoters such as polyisocyanates are employed. Examples 3 and 4 show some improvement in initial bond strength when different adhesive systems (containing ultraviolet light absorbers) are employed with polyvinyl fluoride film whose surface has been rendered receptive by one of the hereinbefore described treatments. However, these bonds were quite unsatisfactory after a brief water immersion. Examples 5, 6 and 7 show good initial and water immersion resistant bonds using an acrylic based adhesive between surface-receptive polyvinyl fluoride film and the polyester structure. Examples 8, 9, 10 and 11 demonstrate obviates the need for either adhesives (Examples 5, 6 and 7) or adhesion promoters (Examples 8, 9, 10 and 11).

TABLE II

| Example No. | Film Type | Film Thickness, mils | Coating Type | Polyester Resin Formulation | Curing Cycle | Pressure During Cure, oz./in.² | Surface Appearance of Panel | Peeling Bond Strength, g./in. | | |
|---|---|---|---|---|---|---|---|---|---|---|
| | | | | | | | | Initial | After 1.5 hours in boiling tap water [1] | After 4 wks. in 40° C. tap water [1] |
| 13 | A-1/TB | 2 | None | R-2 | II | 1 | Coarse wrinkling | CNS | TOB | |
| 14 | A-1/TB | 2 | None | R-3 | II | 1 | Medium wrinkling | CNS | TOB | |
| 15 | A-1/TB | 2 | None | R-6 | II | 1 | Smooth | CNS | TOB | |
| 16 | A/TB | 0.5 | 10 | R-1 | II | 4 | Fine wrinkling | CNS | TOB | CNS |
| 17 | A/TB | 1 | 10 | R-1 | II | 4 | Medium wrinkling | CNS | TOB | CNS |
| 18 | A/TB | 2 | 11 | R-1 | II | 4 | Smooth | CNS | TOB | CNS |
| 19 | A/TB | 2 | 3 | R-1 | II | 1 | ----do---- | CNS | | CNS |

See Table I for explanation of CNS and TOB.
[1] Bond strength tested while panels were still wet.

The data in Table II demonstrate that the surface appearance of the finished polyvinyl fluoride film-clad, fiber-reinforced polyester structure may be altered to achieve artistic and decorative effects by (1) varying the polyester resin formulation while keeping the film thickness constant, as in Examples 13, 14 and 15, or by (2) varying the thickness of the polyvinyl fluoride film while employing the same polyester resin formulation, as in Examples 16, 17, 18 and 19. Examples 16 through 19 further demonstrate the incorporation of ultraviolet light absorbing compounds into these structures at the interface between the polyvinyl fluoride film and the fiber-reinforced polyester structure both with (Examples 16, 17 and 19) and without (Example 18) the use of polyisocyanates. The various surface wrinkling effects are achieved at no sacrifice in either initial or water-immersion bond strengths.

The data in Table IV demonstrate that polyvinyl fluoride films not completely dimensionally stable at 60° C.

TABLE III

| Example No. | Film Type | Film Thickness, mils | Coating Type | Polyester Resin Formulation | Curing Cycle | Pressure During Cure, oz./in.[2] | Surface Appearance of Panel | Peeling Bond Strength, g./in. | | |
|---|---|---|---|---|---|---|---|---|---|---|
| | | | | | | | | Initial | After 1.5 hours in boiling tap water [1] | After 4 wks. in 40° C. tap water [1] |
| 20 | A-1/TB | 2 | None | R-1 | II | 1 | Smooth | CNS | | CNS. |
| 21 | A-1/TB | 2 | do | R-1 | II | 1 | do | CNS | CNS | CNS. |
| 22 | A-1/TB | 2 | do | R-4 | II | 1 | do | CNS | | CNS. |
| 23 | B-1/TB | 1 | do | R-4 | II | 1 | do | CNS | CNS | CNS. |
| 24 | B-1/TB | 1 | do | R-5 | II | 1 | do | CNS | CNS | CNS. |
| 25 | B-1/TB | 1 | do | R-4 | II | 1 | Medium wrinkling | CNS | | CNS. |
| 26 | A/TB | 1 | do | R-5 | II | 1 | Smooth | CNS | | CNS. |

See Table I for explanation of CNS.
[1] Bond strength tested while panels were still wet.

In Table III, Examples 20–25 illustrate the use of different thicknesses of surface-receptive polyvinyl fluoride films which contain homogeneously distributed therein ultraviolet light absorbing compounds and established the fact that the presence of these compounds in the films does not interfere with obtaining a successful bond between the film and the polyester structure. A comparison of the surface appearance of the panel produced in Example 26 with that produced in Example 17 again shows the effect of varying the polyester resin formulation while keeping the film thickness the same.

(Examples 27, 30 and 32) may be employed to produce smooth-surfaced, polyvinyl fluoride film-clad, fiber-reinforced polyester structures while employing a combination of polyester resin formulation and curing conditions which normally result in structures having wrinkled surfaces when used in combination with polyvinyl fluoride film dimensionally stable at 60° C. (Examples 28, 29 and 31).

TABLE IV

| Ex. No. | Film Type | Film Thickness, mils | Shrinkage [2] at 60° C., percent | | Coating Type | Polyester Resin Formulation | Curing Cycle | Pressure During Cure, oz./in.[2] | Surface Appearance of Panel | Peeling Bond Strength, g./in. | | |
|---|---|---|---|---|---|---|---|---|---|---|---|---|
| | | | M.D. | T.D. | | | | | | Initial | After 1.5 hours in boiling tap water [1] | After 4 wks. in 40° C. tap water [1] |
| 27 | C/TB | 1 | 0.4 | 1.0 | None | R-7 | II | 1 | Smooth | CNS | CNS | CNS. |
| 28 | A/TB | 1 | 0.0 | 0.0 | do | R-7 | II | 1 | Severe wrinkling | CNS | CNS | CNS. |
| 29 | B/TB | 2 | 0.0 | 0.0 | do | R-7 | II | 1 | do | CNS | CNS | CNS. |
| 30 | D/TB | 2 | 0.25 | 0.5 | do | R-8 | II | 1 | Smooth | CNS | CNS | CNS. |
| 31 | B/TB | 2 | 0.0 | 0.0 | do | R-8 | II | 1 | Severe wrinkling | CNS | CNS | CNS. |
| 32 | E/TB | 1 | 1.2 | 0.9 | do | R-7 | II | 1 | Smooth | CNS | CNS | CNS. |

See Table I for explanation of CNS.
[1] Bond strength tested while panels were still wet.
[2] Measured after 30 minutes' exposure in a circulating air oven maintained at 60° C. M.D. refers to Machine Direction or direction of longitudinal stretching. T.D. refers to Transverse Direction or direction of transverse stretching.

TABLE V

| Ex. No. | Film Type | Film Thickness, mils | Coating Type | Polyester Resin Formulation | Curing Cycle | Curing Time at Room Temperature, Minutes | Pressure During Cure, oz./in.[2] | Surface Appearance of Panel | Peeling Bond Strength, g./in. | | |
|---|---|---|---|---|---|---|---|---|---|---|---|
| | | | | | | | | | Initial | After 1.5 hours in boiling tap water [1] | After 4 wks. in 40° C. tap water [1] |
| 33 | B/TB | 2 | None | R-9 | III | 0 | 1 | Wrinkled | CNS | CNS | CNS. |
| 34 | B/TB | 2 | None | R-9 | III | 30 | 1 | do | CNS | CNS | CNS. |
| 35 | B/TB | 2 | None | R-9 | III | 60 | 1 | do | CNS | CNS | CNS. |
| 36 | B/TB | 2 | None | R-9 | III | 120 | 1 | Smooth | CNS | CNS | CNS. |
| 37 | A/TB | 1 | None | R-9 | III | 0 | 1 | Wrinkled | CNS | CNS | CNS. |
| 38 | A/TB | 1 | None | R-9 | III | 30 | 1 | do | CNS | CNS | CNS. |
| 39 | A/TB | 1 | None | R-9 | III | 60 | 1 | do | CNS | CNS | CNS. |
| 40 | A/TB | 1 | None | R-9 | III | 120 | 1 | Smooth | CNS | CNS | CNS. |

See Table I for explanation of CNS.
[1] Bond strength tested while panels were still wet.

The data in Table V demonstrate that wrinkling frequently encountered with certain polyvinyl fluoride film/polyester resin formulation combinations may be reduced by modifying the curing cycle to include a preliminary room temperature curing period of sufficient duration.

TABLE VI

| Example No. | Film Type | Film Thickness, mils | Coating Type | Polyester Resin Formulation | Curing Cycle | Pressure Curing Cure, | Surface Appearance of Panel | Peeling Bond Strength, g./in. | | |
|---|---|---|---|---|---|---|---|---|---|---|
| | | | | | | | | Initial | After 6 mo. Outdoor Exposure [1] | |
| | | | | | | | | | At Buffalo, New York | At Hialeah, Florida |
| 41 | A/TF | 1 | None | R-10 | II | 1 oz./in.² | Smooth | CNS | CNS | CNS. |
| 42 | B/TS | 2 | do | R-1 | II | 1 oz./in.² | do | CNS | CNS | CNS. |

See Table I for explanation of CNS.
[1] Mounted on racks facing due south and slanted at 45 degrees to the horizontal.

The data in Table VI demonstrate that the process and products of this invention may be realized by employing polyvinyl fluoride films rendered surface-receptive by treatment techniques other than those employing boron trifluoride-containing atmospheres.

It can be seen from the foregoing examples that the success of the process of this invention does not depend upon high pressures, nor is the use of adhesives or adhesion promoters a requisite. The pressures employed were merely sufficient to insure intimacy of contact between the surface of the polyvinyl fluoride film and the fiber-reinforced polyester mass undergoing the curing cycle.

Moreover, while the foregoing examples demonstrate the use of the invention in the manufacture of flat panels, it will be understood that the technique is equally applicable to the manufacture of structures having a wide variety of shapes.

The use of surface-receptive polyvinyl fluoride films in the manufacture of fiber-reinforced polymeric structures in accordance with the present invention results in the production of reinforced polymeric structures of exceptional resistance to the ravages of outdoor weathering while simultaneously precluding the necessity of the use of a particular film or coating as a parting sheet or mold release agent. In addition, the use of resin-rich gel coats and/or veils or overlays to prevent blooming and fuzzing of the glass fibers due to erosion of the surface layers of the structure, both of which approaches are costly from a raw material as well as from a time-for-application standpoint, is no longer necessary. The polyvinyl fluoride surface provided for these structures exhibits not only a high degree of weatherability but is also hydrolytically stable and highly impermeable to moisture, thereby minimizing the degradative effect of the elements on the structure.

The use of pigments in the polyvinyl fluoride films or dyes on the surface of these films permits the manufacture of fiber-reinforced polymeric structures of varying color and opacity effects with a minimum of expenditure for the ingredients imparting these properties, inasmuch as they are concentrated in the extremely thin layer of the film or its surface rather than distributed throughout the fiber-reinforced polymeric structure itself. When ultraviolet light absorbing compounds are to be employed to protect the basic structure, a similar economy may be effected either by (1) incorporating the light absorbers directly into the polyvinyl fluoride films themselves or by (2) chemically bonding the light absorbers onto a surface of the polyvinyl fluoride film, particularly the surface which is to be united with the fiber-reinforced polymeric structure, as hereinbefore described.

Surface-receptive polyvinyl fluoride films may be employed analogously to provide fiber-reinforced epoxy resin structures of improved weathering characteristics.

I claim:

1. In the process of producing fiber-reinforced polyester structures wherein a mixture consisting essentially of (1) at least one linear polymeric organic ester containing recurring ethylenic unsaturation; (2) at least one addition-polymerizable ethylenically unsaturated organic monomer; and (3) reinforcing fibers is subjected, in a mold surfaced with a mold release agent, to addition-polymerization conditions effective to produce a cured, fiber-reinforced polyester structure, the improvement which comprises using in place of the mold release agent a material consisting essentially of a preformed, solid film of polyvinyl fluoride at least one surface of which contains functional groups selected from the group consisting of ethylenic unsaturation, hydroxyl, carboxyl, carbonyl, amino and amido groups whereby to produce a unitary structure of cured, fiber-reinforced polyester having an adherent surface of polyvinyl fluoride film.

2. In the process of producing fiber-reinforced polyester structures wherein a mixture consisting essentially of (1) at least one linear polymeric organic ester containing recurring ethylenic unsaturation; (2) at least one addition-polymerizable ethylenically unsaturated organic monomer; and (3) reinforcing fibers is subjected, in a mold surfaced with a mold release agent, to addition-polymerization conditions effective to produce a cured, fiber-reinforced polyester structure, the improvement which comprises using in place of the mold release agent a material consisting essentially of a preformed, biaxially oriented, solid film of polyvinyl fluoride at least one surface of which contains functional groups selected from the group consisting of ethylenic unsaturation, hydroxyl, carboxyl, carbonyl, amino, and amido groups, said polyvinyl fluoride film exhibiting a finite shrinkage of from about 0.2% to about 5.0% in each direction of orientation on exposure without restraint at 60° C., whereby to produce a unitary structure of cured, fiber-reinforced polyester having an adherent surface of polyvinyl fluoride film.

3. A composite shaped structure consisting essentially of a substrate of cured, fiber-reinforced organic polyesters, and a surface of polyvinyl fluoride film directly bonded to said substrate, the surface of said film in contact with said substrate containing, prior to bonding, functional groups selected from the group consisting of ethylenic unsaturation, hydroxyl, carboxyl, carbonyl, amino, and amido groups.

4. The composite shaped structure of claim 3 wherein said polyvinyl fluoride film is biaxially oriented and, prior to bonding, exhibits a finite shrinkage on exposure without restraint at 60° C. of from about 0.2% to about 5.0% in each direction of stretch.

5. A composite shaped structure consisting essentially of a substrate of cured, fiber-reinforced organic polyester containing an ultraviolet light-absorbent compound, and a surface of polyvinyl fluoride film directly bonded to said substrate, the surface of said film in contact with said substrate containing, prior to bonding, functional groups selected from the group consisting of ethylenic unsaturation, hydroxyl, carboxyl, carbonyl, amino, and amido groups.

6. The composite shaped structure of claim 5 wherein said polyvinyl fluoride film is biaxially oriented and, prior to bonding, exhibits a finite shrinkage on exposure without restraint at 60° C. of from about 0.2% to about 5.0% in each direction of stretch.

7. A composite shaped structure consisting essentially of a substrate of cured, fiber-reinforced organic polyester, and a surface of polyvinyl fluoride film directly bonded to said substrate, said film having distributed therein an ultraviolet light-absorbent compound, the surface of said film in contact with said substrate containing, prior to bonding, functional groups selected from the group consisting of ethylenic unsaturation, hydroxyl, carboxyl, carbonyl, amino, and amido groups.

8. The composite shaped structure of claim 7 wherein said polyvinyl fluoride film is biaxially oriented and, prior to bonding, exhibits a finite shrinkage on exposure without restraint at 60° C. of from about 0.2% to about 5.0% in each direction of stretch.

9. A composite shaped structure consisting essentially of a substrate of cured, glass fiber-reinforced organic polyester, and a surface of polyvinyl fluoride film directly bonded to said substrate, the surface of said film in contact with said substrate containing, prior to bonding, functional groups selected from the group consisting of ethylenic unsaturation, hydroxyl, carboxyl, carbonyl, amino, and amido groups.

10. The composite shaped structure of claim 9 wherein said polyvinyl fluoride film is biaxially oriented and, prior to bonding, exhibits a finite shrinkage on exposure without restraint at 60° C. of from about 0.2% to about 5.0% in each direction of stretch.

11. A composite shaped structure consisting essentially of a substrate of cured, glass fiber-reinforced organic polyester containing an ultraviolet light-absorbent compound, and a surface of polyvinyl fluoride film directly bonded to said substrate, the surface of said film in contact with said substrate containing, prior to bonding, functional groups selected from the group consisting of ethylenic unsaturation, hydroxyl, carboxyl, carbonyl, amino, and amido groups.

12. The composite shaped structure of claim 11 wherein said polyvinyl fluoride film is biaxially oriented and, prior to bonding, exhibits a finite shrinkage on exposure without restraint at 60° C. of from about 0.2% to about 5.0% in each direction of stretch.

13. A composite shaped structure consisting essentially of a substrate of cured, fiber-reinforced organic polyester, and a surface of polyvinyl fluoride film directly bonded to said substrate, said film having distributed therein an ultraviolet light-absorbent compound, the surface of said film in contact with said substrate containing, prior to bonding, functional groups selected from the group consisting of ethylenic unsaturation, hydroxyl, carboxyl, carbonyl, amino, and amido groups.

14. The composite shaped structure of claim 13 wherein said polyvinyl fluoride film is biaxially oriented and, prior to bonding, exhibits a finite shrinkage on exposure without restraint at 60° C. of from about 0.2% to about 5.0% in each direction of stretch.

References Cited by the Examiner

UNITED STATES PATENTS

| | | | |
|---|---|---|---|
| 2,953,818 | 9/1960 | Barton | 264—178 |
| 2,962,471 | 11/1960 | Lang et al. | 161—188 |
| 2,970,066 | 1/1961 | Brasure | 161—188 |
| 3,051,585 | 8/1962 | Weinberg et al. | 161—188 |
| 3,108,902 | 10/1963 | Galli et al. | 161—188 |

FOREIGN PATENTS

| | | |
|---|---|---|
| 782,383 | 9/1957 | Great Britain. |
| 805,388 | 12/1958 | Great Britain. |

ALEXANDER WYMAN, *Primary Examiner.*

CARL F. KRAFFT, EARL M. BERGERT, *Examiners.*

M. E. ROGERS, W. J. VAN BALEN,
*Assistant Examiners.*